United States Patent [19]

Tan

[11] Patent Number: 5,142,211

[45] Date of Patent: Aug. 25, 1992

[54] FIVE-AXIS ROBOT

[75] Inventor: Archie Tan, Dunwoody, Ga.

[73] Assignee: Progressive Blasting Systems, Inc., Grand Rapids, Mich.

[21] Appl. No.: 509,945

[22] Filed: Apr. 16, 1990

[51] Int. Cl.⁵ .............................................. G05B 11/32
[52] U.S. Cl. .................................. 318/568.1; 318/567; 318/568.17; 318/574; 395/80
[58] Field of Search ................................ 318/560–646; 364/513, 474.02, 474.32; 219/121.82, 121 LU; 901/3, 6, 9, 12, 15–24

[56] References Cited

U.S. PATENT DOCUMENTS

| | | |
|---|---|---|
| 2,822,094 | 2/1958 | Greer . |
| 3,272,347 | 9/1966 | Lemelson . |
| 3,665,148 | 5/1972 | Yasenchak et al. . |
| 3,826,383 | 7/1974 | Richter . |
| 3,884,363 | 5/1975 | Ajlouny . |
| 3,890,552 | 6/1975 | Devol et al. . |
| 3,906,323 | 9/1975 | Ono et al. . |
| 4,205,791 | 6/1980 | Dooley . |
| 4,229,641 | 10/1980 | Ihara . |
| 4,229,642 | 10/1980 | Sakurai et al. . |
| 4,288,020 | 9/1981 | Searles et al. . |
| 4,311,052 | 1/1982 | Jeffras et al. . |
| 4,353,677 | 10/1982 | Susnjara et al. . |
| 4,367,998 | 1/1983 | Causer . |
| 4,438,309 | 3/1984 | Zimmer . |
| 4,518,298 | 5/1985 | Yasukawa . |
| 4,534,697 | 8/1985 | Poncet . |
| 4,579,016 | 4/1986 | Soroka et al. . |
| 4,629,955 | 12/1986 | French et al. ........................ 318/625 |
| 4,662,814 | 5/1987 | Suzuki et al. . |
| 4,723,378 | 2/1988 | VanKuiken, Jr. et al. . |
| 4,787,270 | 11/1988 | Suica . |
| 4,882,881 | 11/1989 | VanKuiken, Jr. et al. . |

FOREIGN PATENT DOCUMENTS 2120202 11/1983 United Kingdom .

*Primary Examiner*—Paul Ip
*Attorney, Agent, or Firm*—Price, Heneveld, Cooper, DeWitt & Litton

[57] ABSTRACT

A five-axis robot mechanism for moving an operative device along three rectilinear axes and two rotational axis including a carriage movable along one rectilinear axis, a cart movable on the carriage and a mast assembly having two elongated members movable along a third rectilinear axis. The two elongated members are rotatable together one rotatable with respect to the other to produce movement of the operative device on two rotatable axes. The carriage, cart and mast assemblies are uniquely arranged with respect to each other produce the five-axis desired movement of the operative device.

21 Claims, 6 Drawing Sheets

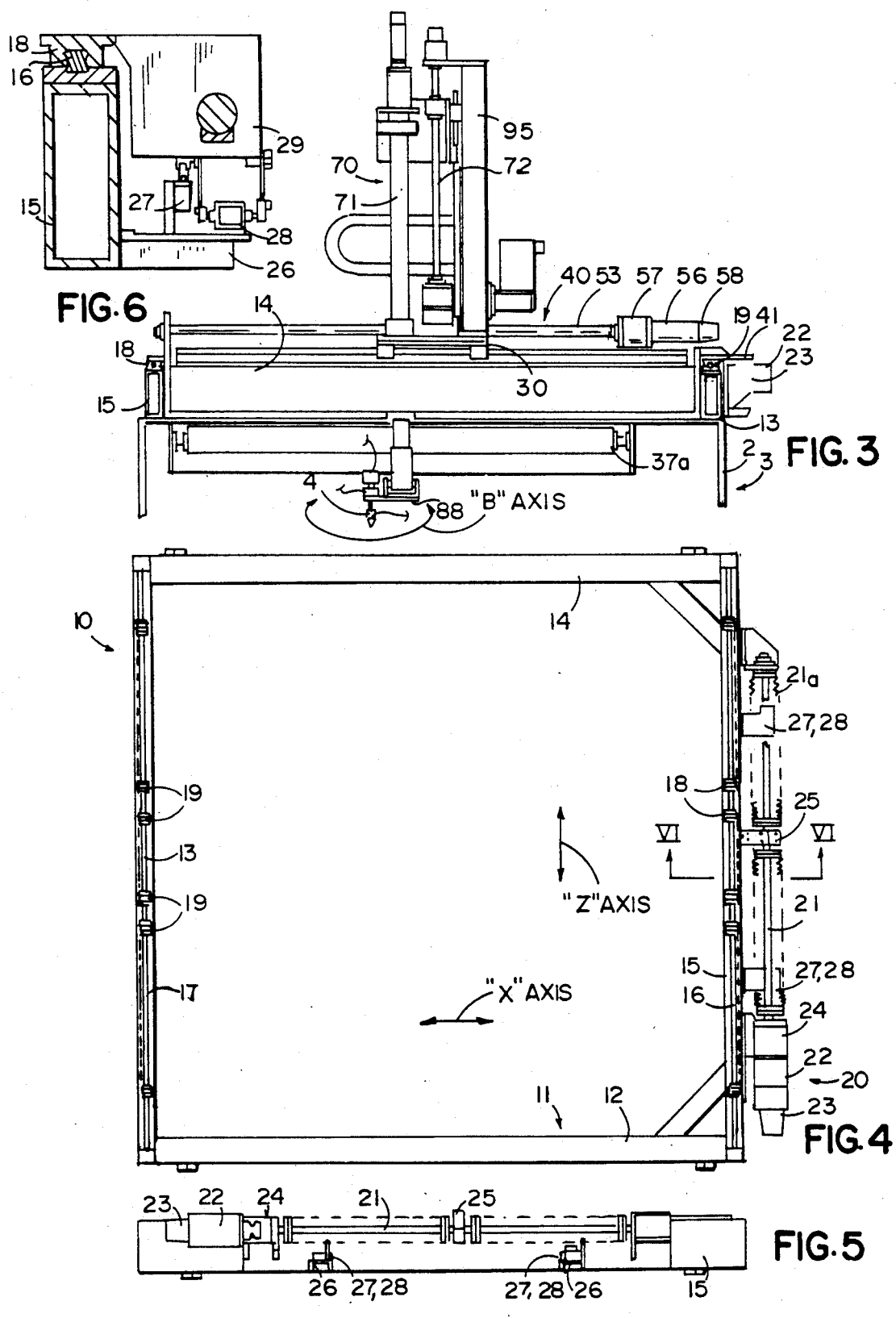

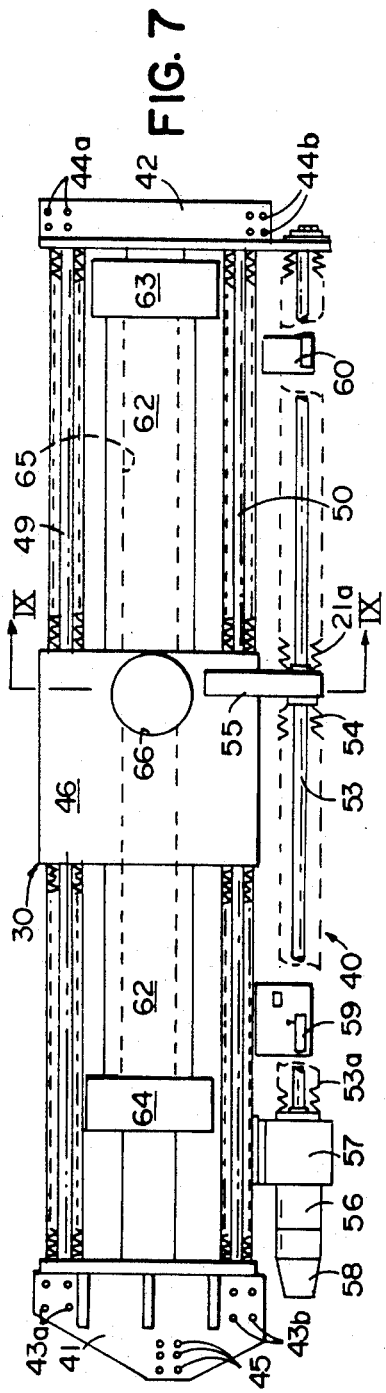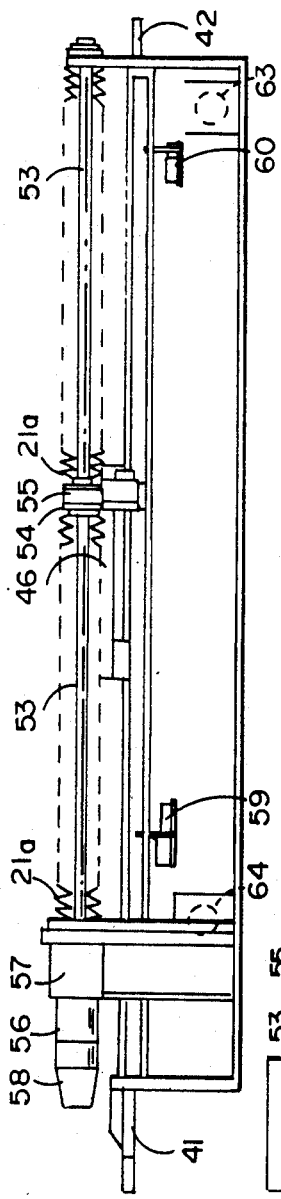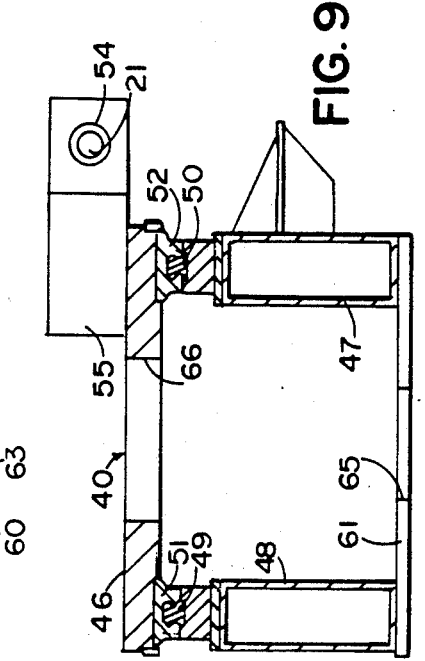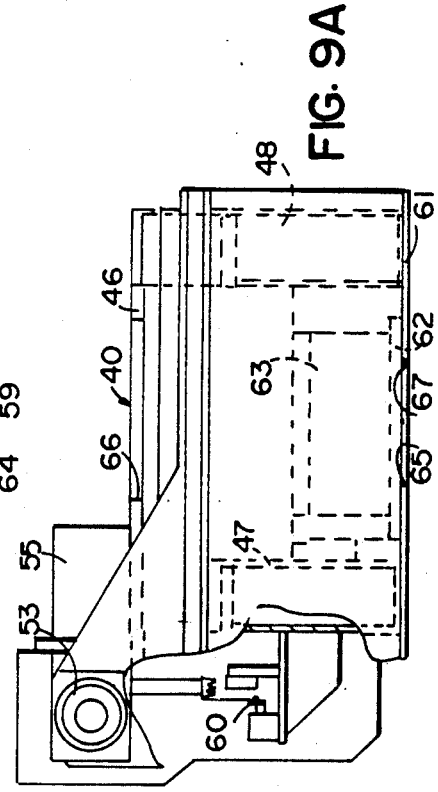

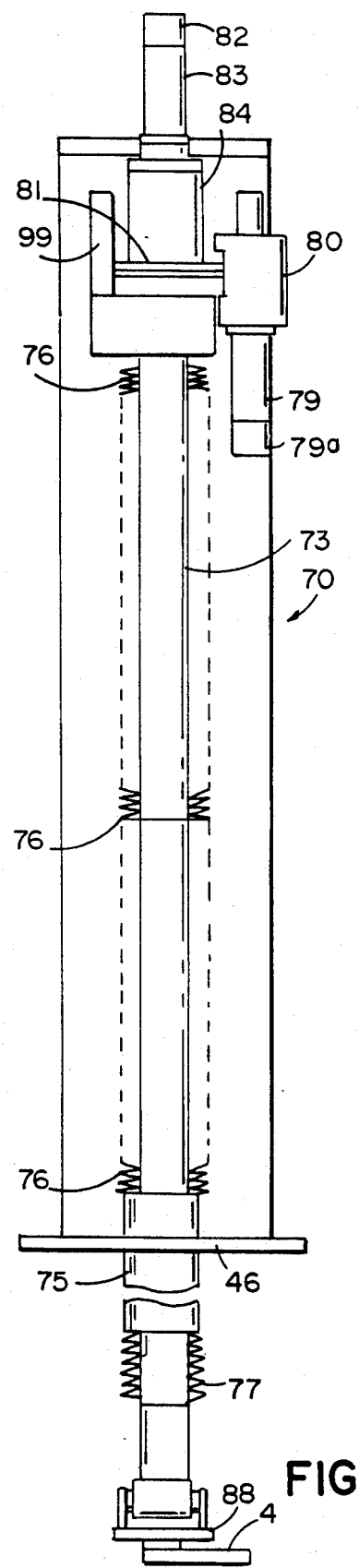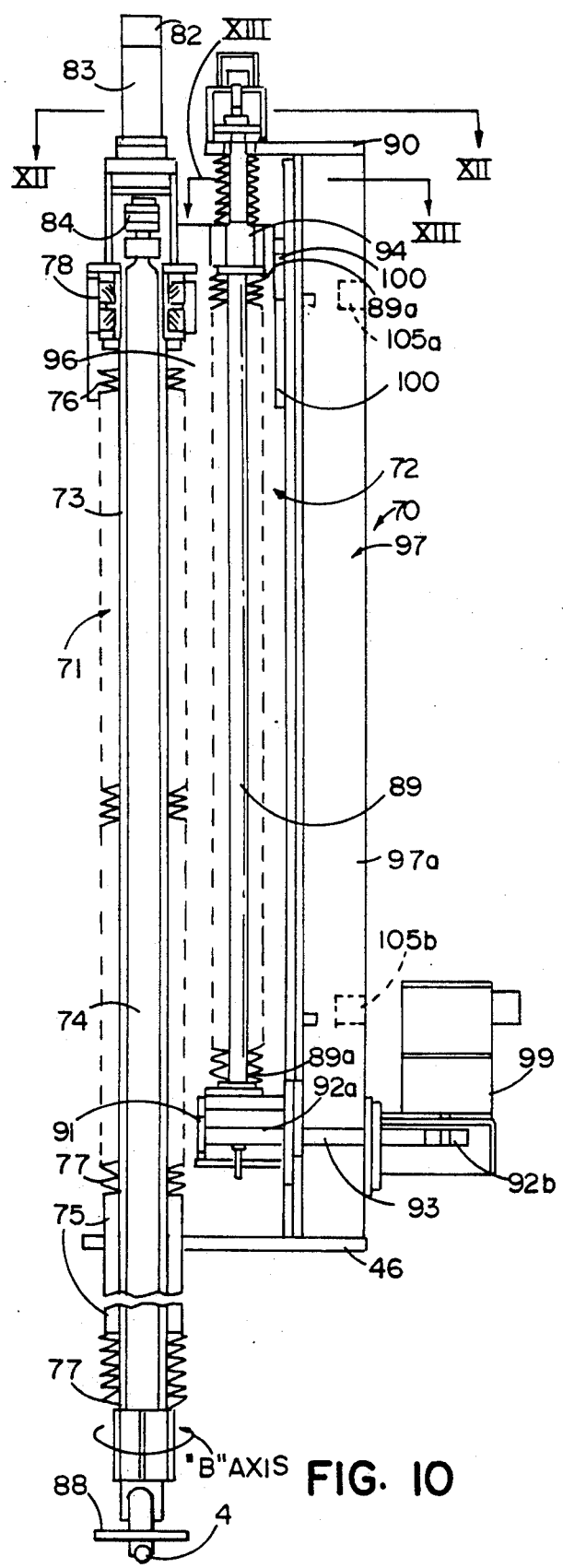
FIG. 11 FIG. 10 "B" AXIS

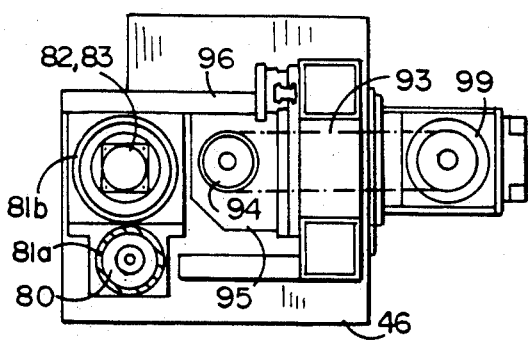
FIG. 12
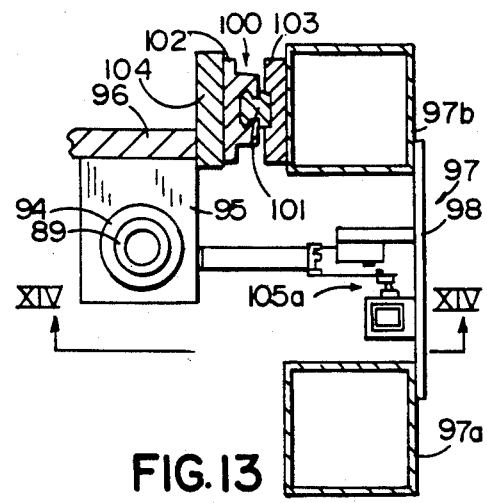
FIG. 13
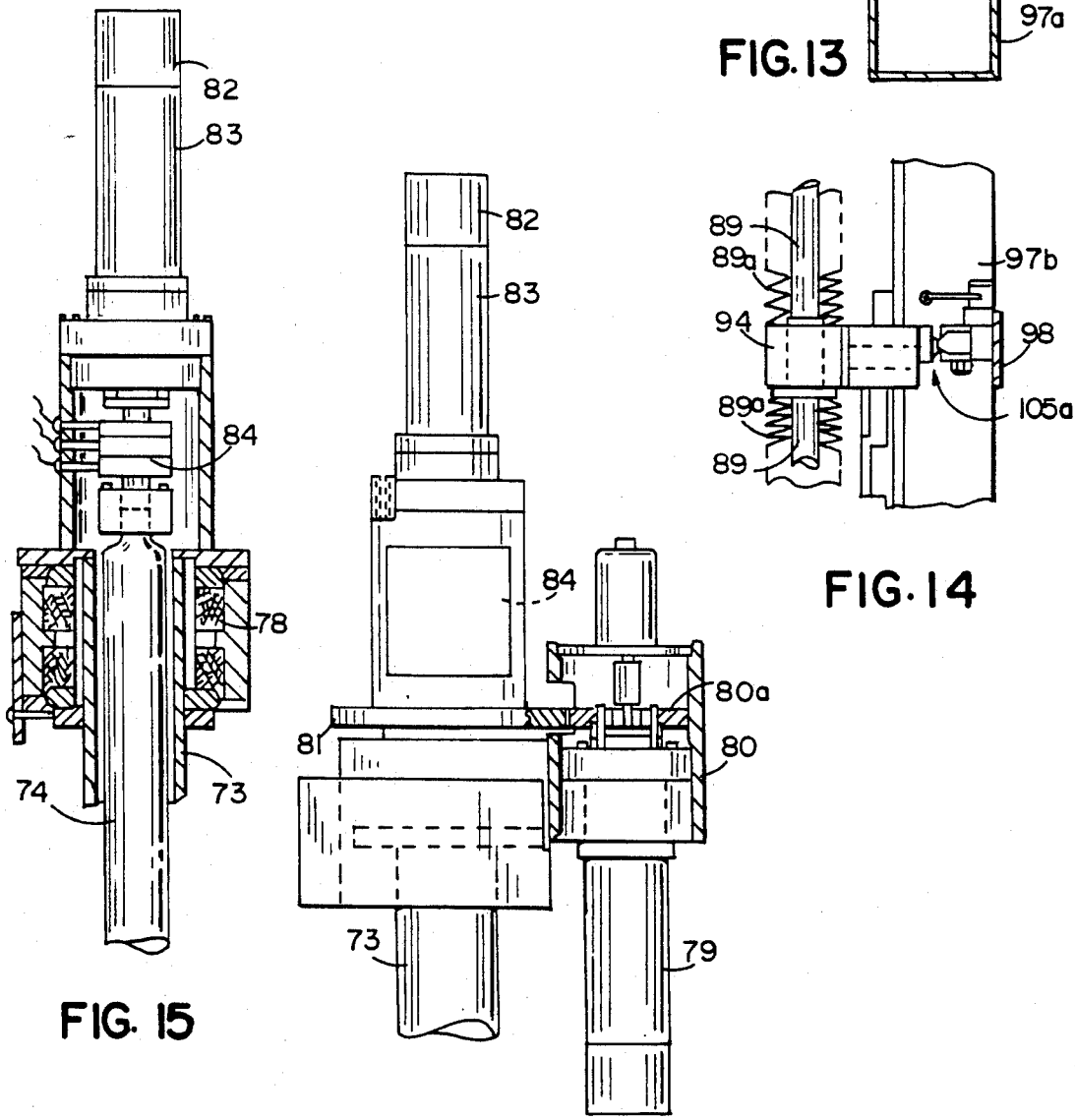
FIG. 14
FIG. 15
FIG. 16

FIVE-AXIS ROBOT

BACKGROUND OF THE INVENTION

This invention relates to a robot and particularly to a so-called five-axis robot for controlling the position of a device which performs an operation on a workpiece. Examples of such operations are blasting (both dry and wet), plasma coating and the like. This invention more particularly relates to a five-axis robot for positioning a device for performing an operation on workpieces located within a relatively large enclosure.

Robots have been designed for positioning certain operative devices that perform operations on workpieces by moving such devices along many different axes both rectilinear and rotational for specific uses in specific environments. For example, U.S. Pat. No. 3,665,148 entitled SIX-AXIS MANIPULATOR discloses a machine which includes a six-axis manipulator for positioning a work head such as a spot welder which moves to different positions with respect to articles moving past the machine. Such type of robots have gained acceptance as highly efficient apparatus for performing work processing operations. However, each operation presents certain problems requiring the design of mechanisms unique to the requirements of the operation.

The design of manipulators or robots for such unique operations requires substantial new concepts and development of the same so that the positioning of orientation of the device for performing operations on the workpieces is accurately controlled. Conventionally, the positioning of the operative devices is controlled by a digital control program including a memory unit which serves to sequentially move the device through predetermined patterns of motion.

The various motions to the specific positions of operative devices are generally known as motions along either rectilinear axes or rotational axes. For example, U.S. Pat. No. 3,665,148 discloses a six-axis robot having guided movement along three rectilinear axes and three rotational axes. It, however, has complicated, expensive, cumbersome structure that would be extremely difficult if not impossible to use in overhead type of suspended robots.

Another type of robot is disclosed in U.S. Pat. No. 4,882,881 entitled ROBOT POSITIONER AND SEAL ARRANGEMENT FOR AN ENCLOSED CHAMBER which is a four-axis robot that moves and positions a blasting gun within an enclosure. Such robot moves the gun along rectilinear axes extending rearwardly and laterally across the room and also up and down at various heights. It also rotates the blasting gun to various angles around a rotatable axis.

SUMMARY OF THE INVENTION

The present invention is a five-axis robot mechanism which is an improvement over the four-axis robot mechanism as disclosed in U.S. Pat. No. 4,882,881. The structure of the robot of the present invention is much simpler in construction than previous robots and provides movement of an operative device on first and second rotatable axes so as to provide movement of such device along three rectilinear axes and two rotatable axes.

The five-axis robot mechanism of the present invention includes an elongated carriage assembly extending along one "X" coordinate or axis and movably supported in two opposite parallel supports such as the walls of a room or cabinet. It also includes a cart mounted on the movable carriage for movement longitudinally of the carriage along a second rectilinear coordinate or axis herein referred to as the "Z" axis. The cart supports a mast assembly which extends upwardly above and downwardly into the cabinet in which is mounted the workpiece on which the device is to operate. This mast assembly is adapted for moving the operative device in a vertical direction along a "Y" axis which is orthogonal or perpendicular to the "X" and "Z" coordinates.

In addition to movement of the device along the "X", "Y" and "Z" coordinates, the mast assembly includes means for rotating the device about the "Y" axis so as to provide movement of the device along a path referred to as the "B" axis. Further, the mast assembly provides for movement of the operating device along a second rotatable axis hereinafter referred to as the "A" axis. All of the above movements of the operating device is accomplished by a relatively simple construction including the above described carriage and cart and an elongated support means extending upwardly from the cart and supported thereon. The mast assembly includes an elongated mast member extending upwardly along and parallel to the support means. An actuating means is provided for causing the mast assembly to move upwardly and downwardly along a vertical rectilinear axis and parallel to the support means. The mast assembly is movably mounted on the support means by means of a guide track.

The mast assembly includes a lance having an elongated central passageway extending substantially the entire length of the mast assembly. An elongated drive shaft is located in the passageway and extends substantially throughout its length. Actuating means is provided for rotating the drive shaft within the passageway of the lance. Separate actuating means is provided for rotating the lance and the second elongated member within and relative to the lance. Further, translating means is connected to the drive shaft for translating the rotational movement of such shaft so as to move said operating device on a second rotational axis. All of the actuating means for movement of the carriage, the cart, the mast assembly, and the rotation of the first and second rotatable elongated means is controlled by encoders and analog-digital converters to selectively cause the actuating means to be operated for achieving the prescribed movements of the operating device attached to the robot.

The present invention provides a unique and exceptional functional robot for use particularly for controlling the movements of operating devices within a relatively large enclosure. However, such apparatus can be utilized not only for operations performed within an enclosure but can be adapted for many different environments where robot positioning is desired for devices which perform an operation on workpieces.

BRIEF DESCRIPTION OF THE DRAWINGS

FIG. 3 is an end-elevational view of the five-axis robot mechanism of this invention;

FIG. 4 is a plan view of the robot base subassembly forming a part of the five-axis robot as disclosed in FIGS. 1, 2 and 3;

FIG. 5 is a side-elevational view of the robot base subassembly of FIG. 4;

FIG. 6 is a cross-sectional view taken along the plane VI—VI of FIG. 4;

FIG. 7 is a plan view of the robot carriage subassembly which provides for movement on the "X" axis;

FIG. 8 is a side-elevational view of the robot carriage subassembly of FIG. 7;

FIG. 9 is a cross-sectional view taken along the plane IX—IX of FIG. 7;

FIG. 9A is an end-elevational view of the robot carriage subassembly of FIGS. 7 and 8;

FIG. 10 is an end-elevational view of the mast assembly including the means for driving it upwardly and downwardly;

FIG. 11 is a side-elevational view of the mechanism of FIG. 10 also disclosing the mast assembly;

FIG. 12 is a cross-sectional view taken along the plane XII—XII of FIG. 10;

FIG. 13 is a cross-sectional view taken along the plane XIII—XIII of FIG. 10;

FIG. 14 is a cross-sectional view taken along the plane XIV—XIV of FIG. 13;

FIG. 15 is a side-elevational view of the top portion of the mast assembly;

FIG. 16 is an end-elevational view of the same top end of the mast assembly forming a part of the five-axis robot of this invention;

BRIEF DESCRIPTION OF THE PREFERRED EMBODIMENT

Figure 1:
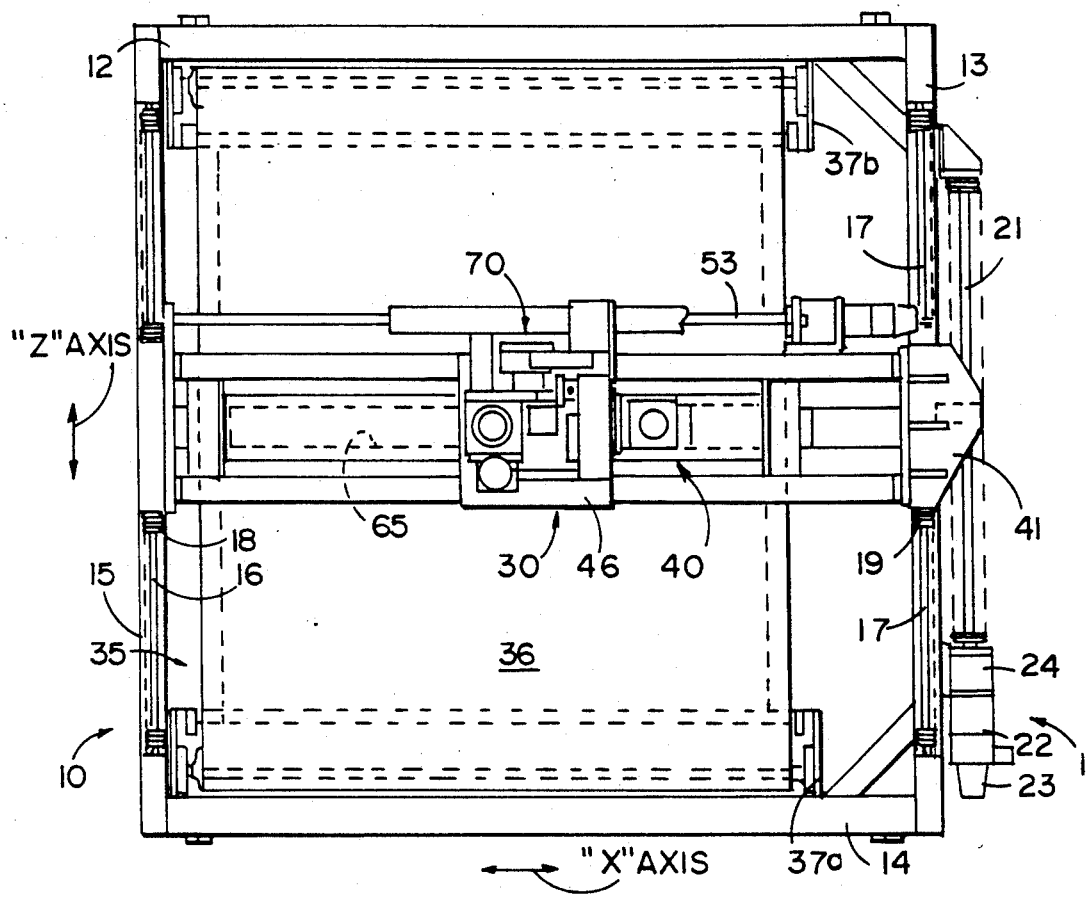
FIG. 1 is a plan view of the five-axis robot mechanism of this invention.
Figure 2:
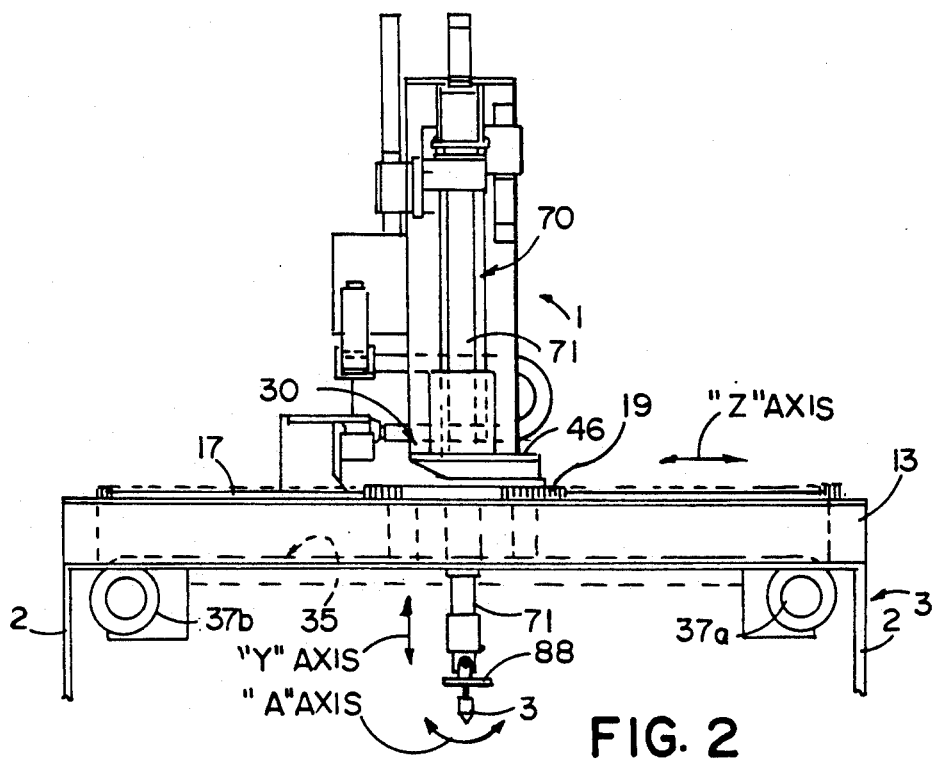
FIG. 2 is a side-elevational view of the five-axis robot mechanism of this invention.

Referring to the drawings, FIGS. 1, 2 and 3 disclose the overall combination of the various subassemblies which make up the five-axis robot mechanism 1 of this invention. Mechanism 1 is shown mounted on the top of the walls 2 of a compartment, room or cabinet 3 in which the workpiece to be operated on is located. The robot mechanism or assembly 1 is a telescopic device provided for supporting and controlling the position of the blasting gun 4 with respect to a workpiece (not shown) mounted in the cabinet. The robot mechanism 1 provides for movement of the gun 4 or any other operative device along the "X" axis and "Z" axis as designated in FIG. 1, the "A" and "Y" axis as designated in FIG. 2 and the "B" axis as designated in FIG. 3. The robot mechanism or assembly 1 includes a robot base subassembly 10 which provides for movement of the carriage subassembly 40 along the rectilinear "Z" axis which provides for rectilinear movement along the "X" axis by means of cart subassembly 30 and provides for movement along the "Y" rectilinear axis and the "A" and "B" rotational axes by means of the mast assembly 70. A seal belt subassembly 35 comprising belt 36 and belt rollers 37a and 37b (FIG. 2) is provided to close off the open top of the cabinet 3 to prevent escape of dust and the like. The details of this seal belt assembly is disclosed in U.S. patent application Ser. No. 509,597, filed on Apr. 16, 1990 (now U.S. Pat. No. 5,067,285) and owned by the assignee of this application.

BASE SUBASSEMBLY

Referring to FIGS. 4, 5 and 6 which disclose in greater detail the robot base subassembly 10, it will be noted that this subassembly is constructed of a rectangular frame 11 of the same size and shape as the top of the cabinet 3. This frame is constructed of the side members 12, 13, 14 and 15. The two side members 12 and 14 are mounted on the top of opposite walls of the cabinet while frame members 13 and 15 are also mounted on opposite walls of the cabinet. The side members 13 and 15 support guide tracks 16 and 17 on which are slidably mounted the blocks 18 and 19 on which the carriage subassembly of FIGS. 7-9 is mounted. The guide tracks 16 and 17 and blocks 18 and 19 permit the movement of the carriage and cart subassembly 40 along the "Z" axis.

An actuating subassembly 20 is provided for the purpose of actuating or moving the carriage subassembly along the guide tracks 16 and 17. This actuating subassembly 20 includes a ball screw 21 driven by a motor 22 the operation of which is controlled by the encoder 23. An accordion type boot 21a covers ball screw drive. A flex coupling 24 is provided between the ball screw 21 and motor 22. A ball nut subassembly 25 which is engaged and driven by the ball screw 21 is secured to the carriage subassembly 40 as will be explained hereinafter.

As disclosed in FIG. 6, near each end of the side member 15 is located a bracket 26 supporting the home switch 27 and limit switch 28 provided to control the operation of the motor 23 by stopping it when the carriage and cart subassembly reach the limit of its travel along the guide rails 16 and 17. These two switches are actuated by an actuator plate 29 attached to the support bracket for the ball nut 25.

CARRIAGE SUBASSEMBLY

As previously stated, the carriage subassembly 40 is mounted on the blocks 18 and 19 of the base subassembly. This is accomplished as disclosed by FIG. 7 by means of the two plates 41 and 42 mounted at each end of the carriage subassembly 40. The openings 43a and 43b are provided in the plate 41 and openings 44a and 44b are provided in plate 42. The fastening means (not shown) extends through these openings and into openings (not shown) in the blocks 18 and 19. Further, plate 41 is secured to the bracket of ball nut 25 by means of fasteners extending through the openings 45 in the plate 41. Thus, when the motor 22 (FIGS. 4 and 5) is actuated, it drives the ball nut 25 and the carriage subassembly 40 attached to the ball nut 25.

The carriage subassembly provides movement along the "X" axis (FIG. 1) by means of driving the cart 30 which includes support plate 46, as disclosed in FIGS. 1 and 2, which supports the mast assembly 70 (FIGS. 1-3) for movement along the "X" axis. The carriage subassembly includes the parallel rail supports 47 and 48 (FIGS. 9 and 9A) supporting the guide rails 49 and 50 on which the blocks 51 and 52 are slidably mounted and support the support plate 46. Thus, the support plate 46 is permitted to travel or slide along the rails 49 and 50 from one end to the other end.

The mast support plate 46 is driven by the ball screw 53 and ball nut 54, the nut being supported on the ball nut bracket 55 welded to and extending to one side of the mast support plate 46. The ball screw which is covered by boot 53a is driven by the motor 56 through a flexible coupling 57. An encoder 58 is provided as part of the control for controlling the operation of motor 56.

Limit switch and encoder means 59 and 60 are provided at each end of the carriage subassembly for controlling the movement of the mast support plate 46 and therefore the mast subassembly 70, along the "Z" axis.

A plate 61 (FIGS. 9 and 9A) is mounted at the lower ends of the rail supports 47 and 48 as is a belt 62 and the belt take up rollers 63 and 64. The plate 61 has a slot 65 extending substantially its entire length for receiving a part of the mast assembly 70 to be described hereinafter. Such part also extends through the opening 66 in the mast support plate 46 (FIG. 7). The belt 62 provides the function of closing off the slot 65 but still permitting the mast to move along the slot, all of which is generally disclosed in U.S. Pat. No. 4,882,881. The rollers 63 and 64 take up or release the belt 62 as the mast subassembly 70 moves through slot 65 along the carriage subassembly 40.

MAST ASSEMBLY

FIGS. 10-16 best disclose the details of the mast assembly 70. As previously disclosed, the mast assembly 70 is supported on the mast support plate 46 for movement along the carriage subassembly 40 along the rectilinear axis "X". As previously disclosed, the mast assembly provides for movement of the operative device 4, such as a blast or plasma gun, along the rectilinear "Y" axis and the rotational "A" and "B" axes. The mast assembly 70 includes the mast subassembly 71, the "Y" axis drive subassembly 72 and the guide support subassembly 97. Mast subassembly 71 comprises the lance 73, which is a hollow tube extending substantially the entire length of the mast subassembly 71 and having extending therethrough the drive shaft 74. The lance 73 is guided by a lance guide 75 secured to plate 46. The lance 73 is covered by the accordion type boot 76 at its top end above plate 46 and by the accordion boot 77 at the lower end below the lance guide 75. The lance is mounted for rotation about the "B" rotational axis by means of the bearings 78 located at the upper end of the lance. Lance 73 is rotatably driven by a motor 79 (FIGS. 11 and 12) through a reducer gear box 80 and the gears 81a and 81b. The operation of the motor 79 is controlled by the encoder 79a which obviously is connected to the entire control program circuit (not disclosed).

Figure 17:
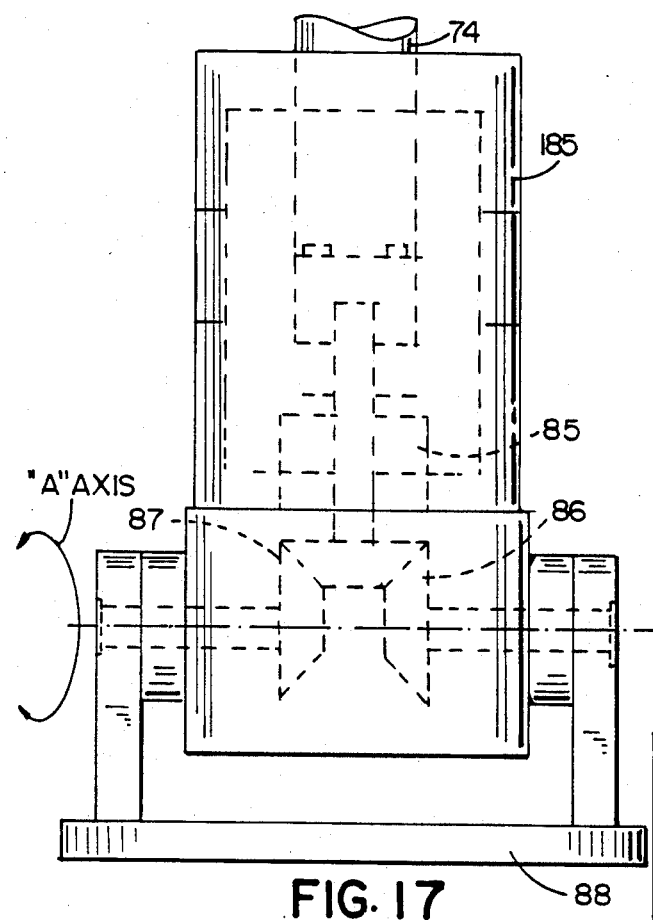
FIG. 17 is an enlarged, partial, side-elevational view of the lower end of the mast assembly.
Figure 18:
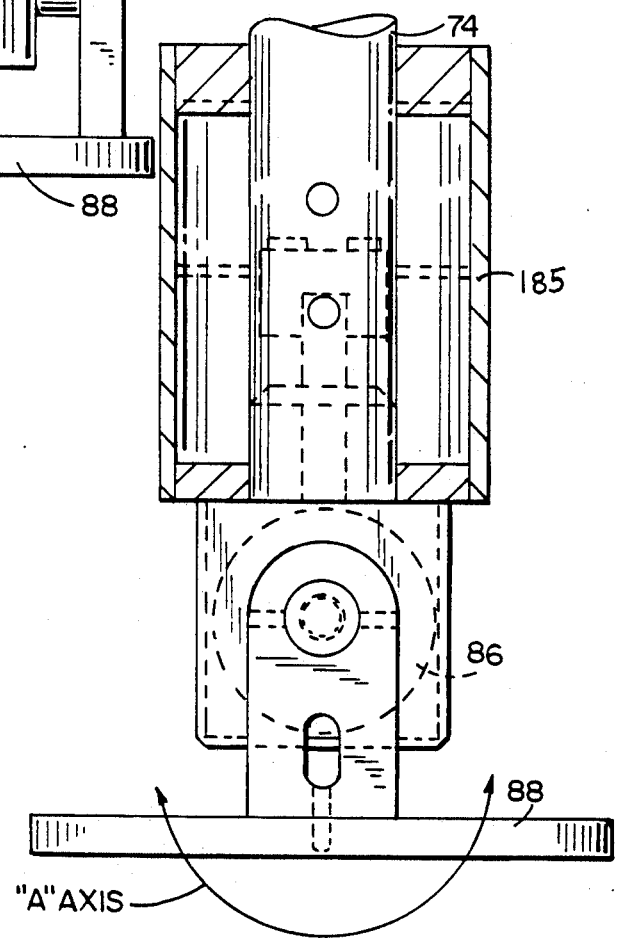
FIG. 18 is an enlarged, partial, end-elevational view of the lower end of the mast assembly.

The drive shaft 74 is driven by motor 83 through a flexible coupling 84 for providing movement of the operative device 3 on the rotatable "A" axis. This is accomplished by connecting drive shaft 74 to a gear 85 (FIGS. 17 and 18) which in turn engages the gears 86, 87 to rotate the support 88 on which the operative device 3 is mounted. Gears 85, 86, 87 are located in the gear box 185 secured at the lower end of lance 73. The operation of motor 83 is controlled in conjunction with the encoder 82 along with the control program circuit previously referred to.

Lance 73 is driven along the "Y" axis by means of the "Y" axis drive 72 (FIG. 10) which includes ball screw 89 covered by the accordion type boot 89a and supported on ball screw plate 90 and ball screw support bracket 91 which also supports the timing belt pulley 92a which is driven by the timing belt 93 by means of the motor 94 and timing belt pulley 92b. The ball screw 89 engages the ball nut 94 to which is secured the bracket 95 (FIGS. 12 and 13) which in turn is mounted on the support bracket 96 (FIG. 12) which supports the entire mast subassembly 71. Support bracket 96 is mounted on the guide support subassembly 97 which includes two vertical and parallel columns 97a and 97b secured together by the plate 98. Spaced side rail subassemblies 100 (FIG. 13) secured to the support plate 96 and the support column 97b are provided for guiding the mast subassembly 71 upwardly and downwardly along the "Y" axis. These guide rail subassemblies include the guide rails 101 and block 102, the guide rail 101 being secured to column 97B by the member 103 and the block 102 being secured to the support member 99 by the member 104 (FIG. 13). These guide rail assemblies are of the type manufactured and sold by THK Co., Ltd. and are of the guide type HSR. This "Y" axis drive subassembly 72 operates by motor 99 rotating the ball screw 89 through the timing belt 93.

As the ball nut 94 is driven downwardly or upwardly, the entire mast subassembly except for the lance guide 75 is moved upwardly or downwardly by the rotation of the ball screw 89 and the resultant movement of the ball nut 94 to which the mast subassembly 71 is attached. At the end of the travel are located limit switches 105 (FIGS. 10, 13 and 14) to limit the travel of ball nut 94 and the upward and downward movement of the mast subassembly 71.

OPERATION

The operation of this five-axis robot mechanism should be evident from the above described base subassembly 10, carriage subassembly 40, and the mast assembly 70. It should be understood that the actuating means for each of these subassemblies along the "X", "Z", "Y", "A" and "B" axes are program controlled through conventional encoders and programs which are automatically operable in accordance with such programs to selectively actuate the various drive means for achieving the prescribed movements. Insofar as the controls form no part of the present invention, the description of the operation of this five-axis robot mechanism will be made with reference to the influence of the drive units in providing the requisite movement. It should be understood that there could be several simultaneous movements of the operative device. For example, there could be simultaneous movement along any combination of or all of the "X", "Z", "Y", "B" and "A" axes so as to accurately position the operative device for performing its preprogrammed operation on a workpiece.

Movement along the "Z" axis is caused by operation of the motor 22 which drives the carriage subassembly 40 either to the right or to the left as viewed in FIGS. 1 and 2. This is accomplished by rotation of the ball screw 21 which moves the ball nut 25 attached to the carriage subassembly 40. This moves the entire mast assembly 70 which is mounted on the mast support plate 46, with the mast subassembly 71 extending downwardly through the opening 66 and slot 65 into the compartment or cabinet 2. As the carriage subassembly 40 moves along the top of the cabinet 2, the belt 35 attached to each side of the carriage subassembly covers the top of the cabinet 2 as described more specifically in the copending application Ser. No. 509,957, filed Apr. 16, 1990 (now U.S. Pat. No. 5,067,285).

The movement of the operative device 1 mounted at the lower end of the mast subassembly 71 is moved along the "X" axis by means of the mast support plate 46 riding on the guide rails 49 and 50 (FIGS. 7 and 9). The support plate 46 is driven by the motor 56 which drives the ball screw 53 that in turn engages and drives the screw nut 54 to which plate 46 is attached by the bracket or ball nut support 55. Thus, the entire mast assembly is moved along the "X" axis with the mast 71 extending through the opening 66, through the slot 65 and into the cabinet 2. The slot 65 is covered by the belt 62 (FIGS. 7 and 9A) attached to opposite sides of the mast support plate and taken up and relieved by the rollers 63 and 64.

The motion of the operative device 3 along the "Y" axis is accomplished by means of the motor 94 which drives the timing belt pulley 92, the timing belt 93 and the timing belt 92B to which the ball screw 89 is attached for rotation therewith. Ball screw 89 engages the ball nut 94 causing it to be driven either upwardly or downwardly depending upon the direction of rotation of the motor 99. This causes the movement either in an up or down direction along the "Y" axis of the mast subassembly 71 which is attached to the ball nut 94 by means of the brachets 95 and 96 (FIGS. 10, 12 and 13).

The movement of the operative device 4 on the rotational axes "A" and "B" is produced by the rotation of the lance 73 and the rotation of the drive shaft 74. The lance 73 and drive shaft 74 are both rotated together by means of the motor 79 driving a gear 81a within the gear box 80 which in turn engages and drives the gear 81b. This simultaneous rotational movement of the lance 73 and the drive shaft 74 is permitted by bearing subassembly 78 which is supported by the support plate 99.

In addition to being rotatable about the "B" axis, drive shaft 74 also is rotatably driven independently by the motor 83 through the flexible coupling 84. Rotation of the drive shaft 74 rotates the gear 85 located in a housing attached to the lower end of the lance 73. Rotation of gear 85 is translated to rotation of gears 86 and 87 (FIG. 17) causing the support 88 for the operative device to be rotated on the rotational "A" axis as disclosed in FIGS. 17 and 18.

In the above description, I have disclosed a five-axis robot mechanism which is relatively simple in construction, has relatively less backlash as prior known robot mechanisms. The various elements of the mechanism are easily accessible for maintenance and replacement. Although the basic movements about the five-axis are not new, the way in such movements are accomplished is novel and has distinct advantages over other known five-axis robot mechanisms.

Although a preferred embodiment has been disclosed herein, it should be understood that other modifications and embodiments can be utilized without departing from the spirit of this invention. Therefore, this invention should not be limited to only the embodiment illustrated which has been described as an example only.

The embodiments of the invention in which an exclusive property or privilege is claimed are defined as follows:

1. A five-axis robot having means for supporting a device and means for controlling the movement of said device to position said device for performing an operation on a workpiece comprising:
   an elongate carriage;
   means for supporting said carriage for movement on a horizontal plane;
   a first actuating means for moving said carriage on said plane along a first rectilinear axis;
   a cart assembly operatively associated with said carriage for longitudinal movement on said carriage along said plane and a second rectilinear axis;
   second actuating means for moving said cart assembly along said second rectilinear axis;
   elongated support means extending upwardly along a third rectilinear axis perpendicular to said horizontal plane;
   an elongated mast member extending upwardly along said third rectilinear axis parallel to said guide means and substantially perpendicular to said first and second rectilinear axis;
   guide track means on said support means for movably supporting said mast assembly on said support means along said third rectilinear axis;
   third actuating means for causing said mast assembly to move upwardly and/or downwardly along said third rectilinear axis;
   said elongated mast assembly including a first elongated member having an elongated central passageway extending substantially the entire length thereof;
   a second elongated member located in said passageway and extending substantially throughout the length of said passageway;
   a fourth actuating means for rotating said second elongated member within said passageway;
   said mast assembly including fifth actuating means for rotating said first elongated member on a first rotational axis located about said third rectilinear axis;
   a rotatable support means for said device supported at the lower ends of said first and second elongated members;
   translating means operatively connecting said second elongated member and said support means for translating the rotatable motion of said second elongated member about said third axis to a rotatable motion of said rotatable support means and thus said device on a second rotational axis substantially perpendicular to said second axis; and
   means for controlling said first, second, third, fourth and fifth actuating means whereby said device can be moved on five axes including three rectilinear axes and two rotational axes as it performs an operation on a workpiece.

2. The robot of claim 1 in which the said elongated support means is rigidly mounted on a base member from which said elongated support member extends upwardly and said elongated mast assembly is parallel to said support means;
   a guide member extending through an opening in said base member and having a central opening receiving said first elongated member;
   connecting means secured to the upper part of said mast assembly and extending to said support means, said connecting means having means engaging said guide track means for slidably supporting the first elongated member.

3. The robot of claim 2 in which the third actuating means includes a nut mounted on said connecting means;
   a screw located between said elongated support means and said mast assembly and engaging said nut; and
   a first motor for driving said screw whereby said mast assembly moves upwardly and/or downwardly in response to the operation of said first motor.

4. The robot of claim 3 in which the fourth actuating means includes a second motor supported at the top end of said second elongated member for rotatably driving said second elongated member.

5. The robot of claim 4 in which the fifth actuating means includes means for supporting a third motor on said connecting means; said third motor being operatively connected to said first elongated member for rotating the same;
   said entire mast including said first and second elongated members and said second and third motors being movable together upwardly and/or downwardly by said third actuating means.

6. The robot of claim 2 in which the elongated support means includes two spaced towers, screw support means and nut support means spanning said towers and secured to the sides thereof closest to said mast assembly;
   a screw mounted on said screw support means;
   a nut supported on said nut support means;
   said screw and nut thereby being located between said towers and said mast assembly;
   a motor support means spanning and mounted on said towers on the opposite sides thereof as said screw support means and nut support means and supporting a motor;
   said screw, nut, and motor being operatively connected together to form said third actuating means for causing said mast assembly to move upwardly and/or downwardly along said third rectilinear axis.

7. The robot of claim 1 in which the said elongated support means is rigidly mounted on a base member from which said elongated support member extends upwardly and said elongated mast assembly is parallel to said support means;
   a guide member extending through an opening in said base member and having a central opening receiving said first elongated member;
   connecting means secured to the upper part of said mast assembly and extending to said support means, said connecting means having means engaging said guide track means for slidably supporting the first elongated member;
   said third actuating means including a nut mounted on said connecting means;
   a screw located between said elongated support means and said mast assembly and engaging said nut;
   a first motor for driving said screw whereby said mast assembly moves upwardly and/or downwardly in response to the operation of said first motor;
   said fourth actuating means including a second motor supported at the top end of said second elongated member for rotatably driving said second elongated member;
   said fifth actuating means including means for supporting a third motor on said connecting means; said third motor being operatively connected to said first elongated member for rotating the same;
   said entire mast including said first and second elongated members and said second and third motors being movable together upwardly and/or downwardly by said third actuating means.

8. The robot of claim 6 in which said fourth actuating means includes a motor supported at the top end of said second elongated member for rotatably driving said second elongated member;
   said fifth actuating means including means for supporting a motor on said connecting means; said motor on said connecting means being operatively connected to said first elongated member for rotating the same;
   said entire mast including said first and second elongated members and said motors being movable together upwardly and/or downwardly by said third actuating means.

9. The robot of claim 2 in which the elongated support means includes two spaced towers, screw support means and nut support means spanning said towers and secured to the sides thereof closest to said mast assembly;
   a screw mounted on said screw support means;
   a nut supported on said nut support means;
   said screw and nut thereby being located between said towers and said mast assembly;
   a motor support means spanning and mounted on said towers on the opposite side of said screw support means and nut support means;
   a motor supported on said motor support means;
   said screw, nut, and motor being operatively connected together to form said first actuating means for causing said mast assembly to move perpendicular to said horizontal plane along said third rectilinear axis.

10. A five-axis robot having means for supporting a device and means for controlling the movement of said device to position said device for performing an operation located in a closed compartment having at least two sides comprising:
    an elongated carriage spanning the distance between said two sides;
    means for supporting said carriage for movement along said sides substantially on a horizontal plane;
    first actuating means for moving said carriage on said plane along a first rectilinear axis;
    cover means secured to the opposite longitudinal edges of said carriage for continuously forming a closed ceiling for said compartment as said carriage moves;
    a cart assembly operatively associated with said carriage for longitudinal movement on said carriage along said plane and a second rectilinear axis;
    second actuating means for moving said cart assembly along said second rectilinear axis;
    elongated support means extending upwardly from said cart along a third rectilinear axis perpendicular to said horizontal plane;
    an elongated mast member extending upwardly along said third rectilinear axis parallel to said guide means and substantially perpendicular to said first and second rectilinear axis;
    guide track means on said support means for movably supporting said mast assembly on said support means along said third rectilinear axis;
    third actuating means for causing said mast assembly to move upwardly and/or downwardly along aid third rectilinear axis;
    said elongated mast assembly including a first elongated member having an elongated central passageway extending substantially the entire length thereof;
    second elongated member located in said passageway and extending substantially throughout the length of said passageway;
    a fourth actuating means for rotating said second elongated member within said passageway;

said mast assembly including fifth actuating means for rotating said first elongated member on a first rotational axis located about said third rectilinear axis;

a rotatable support means for said device supported at the lower ends of said first and second elongated members;

translating means operatively connecting said second elongated member and said support means for translating the rotatable motion of said second elongated member about said third axis to a rotatable motion of said rotatable support means and thus said device on a second rotational axis substantially perpendicular to said second axis; and means for controlling said first, second, third, fourth and fifth actuating means whereby said device can be moved on five axes including three rectilinear axes and two rotational axes as it performs an operation on a workpiece.

11. The robot of claim 10 in which the said elongated support means is rigidly mounted on a base member from which said elongated support member extends upwardly and said elongated mast assembly is parallel to said support means;

a guide member extending through an opening in said base member and having a central opening receiving said first elongated member;

connecting means secured to the upper part of said mast assembly and extending to said support means, said connecting means having means engaging said guide track means for slidably supporting the first elongated member.

12. The robot of claim 11 in which the third actuating means includes a nut mounted on said connecting means;

a screw located between said elongated support means and said mast assembly and engaging said nut; and a first motor for driving said screw whereby said mast assembly moves upwardly and/or downwardly in response to the operation of said first motor.

13. The robot of claim 12 in which the fourth actuating means includes a second motor supported at the top end of said second elongated member for rotatably driving said second elongated member.

14. The robot of claim 13 in which the fifth actuating means includes means for supporting a third motor on said connecting means; said third motor being operatively connected to said first elongated member for rotating the same;

said entire mast including said first and second elongated members and said second and third motors being movable together upwardly and/or downwardly by said third actuating means.

15. The robot of claim 11 in which the elongated support means includes two spaced towers, screw support means and nut support means spanning said towers and secured to the sides thereof closest to said mast assembly;

a screw mounted on said screw support means;
a nut supported on said nut support means;
said screw and nut thereby being located between said towers and said mast assembly;
a motor support means spanning and mounted on said towers on the opposite sides thereof as said screw support means and nut support means and supporting a motor;
said screw, nut, and motor being operatively connected together to form said third actuating means for causing said mast assembly to move upwardly and/or downwardly along said third rectilinear axis.

16. The robot of claim 10 in which the said elongated support means is rigidly mounted on a base member from which said elongated support member extends upwardly and said elongated mast assembly is parallel to said support means;

a guide member extending through an opening in said base member and having a central opening receiving said first elongated member;

connecting means secured to the upper part of said mast assembly and extending to said support means, said connecting means having means engaging said guide track means for slidably supporting the first elongated member;

said third actuating means including a nut mounted on said connecting means;

a screw located between said elongated support means and said mast assembly and engaging said nut;

a first motor for driving said screw whereby said mast assembly moves upwardly and/or downwardly in response to the operation of said first motor;

said fourth actuating means including a second motor supported at the top end of said second elongated member for rotatably driving said second elongated member;

said fifth actuating means including means for supporting a third motor on said connecting means; said third motor being operatively connected to said first elongated member for rotating the same;

said entire mast including said first and second elongated members and said second and third motors being movable together upwardly and/or downwardly by said third actuating means.

17. The robot of claim 15 in which said fourth actuating means includes a motor supported at the top end of said second elongated member for rotatably driving said second elongated member;

said fifth actuating means includes means for supporting a motor on said connecting means; said motor on said connecting means being operatively connected to said first elongated member for rotating the same;

said entire mast including said first and second elongated members and said motors being movable together upwardly and/or downwardly by said third actuating means.

18. A robot having means for supporting a device and means for controlling movement of said device to position said device for performing an operation on a workpiece comprising:

elongated support means extending along a rectilinear axis perpendicular to a given plane;

an elongated mast member extending upwardly along said rectilinear axis parallel to said guide means and substantially perpendicular to said given plane;

guide track means on said support means for movably supporting said mast assembly on said support means along said rectilinear axis;

first actuating means for causing said mast assembly to move in either direction along said rectilinear axis;

said elongated mast assembly including a first elongated member having an elongated central passageway extending substantially the entire length thereof;

a second elongated member located in said passageway and extending substantially throughout the length of said passageway;

a second actuating means for rotating said second elongated member within said passageway;

said mast assembly including third actuating means for rotating said first and second elongated members together on a first rotational axis located about said rectilinear axis;

a rotatable support means for said device supported at one of the ends of said first and second elongated members;

translating means operatively connecting said second elongated member and said support means for translating the rotatable motion of said second elongated member about said rectilinear axis to a rotatable motion of said rotatable support means and thus said device on a second rotational axis substantially perpendicular to said rectilinear axis; and means for controlling said first, second and third, actuating means whereby said device can be moved on three axes including one rectilinear axes and two rotational axes as it performs an operation on a workpiece.

19. The robot of claim 18 in which a connecting means is provided secured to said mast assembly; said connecting means having means engaging said guide track means for slidably supporting the first elongated member; said first actuating means including a nut mounted on said connecting means;
- a screw located between said elongated support means and said mast assembly and engaging said nut; and
- a first motor for driving said screw whereby said mast assembly moves in a direction perpendicular to said given plane in response to the operation of said motor.

20. The robot of claim 19 in which the second actuating means includes a second motor supported at the top end of said second elongated member for rotatably driving said second elongated member.

21. The robot of claim 20 in which the third actuating means includes means for supporting a third motor on said connecting means; said third motor being operatively connected to said first elongated member for rotating the same;
- said entire mast including said first and second elongated members and said second and third motors being movable together in a direction perpendicular to said given plane by said first actuating means.

* * * * *

UNITED STATES PATENT AND TRADEMARK OFFICE
CERTIFICATE OF CORRECTION

PATENT NO.   : 5,142,211
DATED        : August 25, 1992
INVENTOR(S)  : Archie Tan It is certified that error appears in the above-identified patent and that said Letters Patent is hereby corrected as shown below:

In the Abstract, line 3:
"axis including" should be --axes including--.

In the Abstract, line 4:
"carraige" should be --carriage--.

In the Abstract, line 10:
After "other" insert --to--.

Column 3, line 65:
"509,597" should be --509,957--.

Column 7, line 61:
"elongate" should be --elongated--.

Column 10, line 56, claim 10:
"along aid" should be --along said--.

Signed and Sealed this

Ninth Day of November, 1993

Attest:

BRUCE LEHMAN

*Attesting Officer*      *Commissioner of Patents and Trademarks*